United States Patent [19]
Kitagawa

[11] 3,977,804
[45] Aug. 31, 1976

[54] MULTIPLE SPINDLE DRILLING MACHINE FOR WIDE FLANGE BEAMS

[75] Inventor: Toshikatsu Kitagawa, Seki, Japan

[73] Assignee: Miyakawa Industry Company, Ltd., Japan

[22] Filed: Mar. 3, 1975

[21] Appl. No.: 554,921

[30] Foreign Application Priority Data
Mar. 3, 1974 Japan............................. 49-24928

[52] U.S. Cl................................. 408/16; 408/39; 408/42; 408/50; 408/51
[51] Int. Cl.² ................ B23B 49/00; B23B 39/22
[58] Field of Search ............ 408/39, 16, 42, 50, 408/51

[56] References Cited
UNITED STATES PATENTS
| | | | |
|---|---|---|---|
| 1,904,975 | 4/1933 | Babcock | 408/42 X |
| 3,094,015 | 6/1963 | Mead | 408/39 X |
| 3,687,563 | 8/1972 | McConnel | 408/39 |

Primary Examiner—Leon Gilden
Attorney, Agent, or Firm—George B. Oujevolk

[57] ABSTRACT

A multiple spindle drilling machine can simultaneously drill a plurality of bores for inserting the rivets or the bolts through the web and a pair of flanges of wide flange beams which are used in building and construction by a first, second and third drilling assembly. A supporting device mounted on the upper side of a machine table which stops the wide flange beam is fed by a feeding device thereon and supports it at a predetermined drilling position. The first drilling assembly is mounted so as to be movable toward the vertical direction from the upper position of the machine table and has multi-drills for drilling a plurality of bores through the web of the wide flange beam. The second and third drilling assemblies are mounted so as to be movable toward the horizontal direction from both of the side positions of the machine table and have multi-drills for drilling a plurality of bores through both flanges of the wide flange beam.

10 Claims, 11 Drawing Figures

MULTIPLE SPINDLE DRILLING MACHINE FOR WIDE FLANGE BEAMS

The present invention relates to a multiple spindle drilling machine which for wide flange beams, more particularly it relates to a multiple spindle drilling machine can simultaneously drill a plurality of bores for inserting the rivets or the bolts through the web and a pair of flanges of a wide flange beam which is used in building and construction.

Conventionally, in the case of using a plurality of wide flange beams for building and construction, the range from 6 to 10 pieces of bores for inserting the rivets or the bolts were drilled through the web and a pair of flanges at both ends of each of the wide flange beams and a plurality of wide flange beams were connected by inserting the rivets or the bolts into the bores thereof with splice plates or the like. And, in order to drill a plurality of bores through the web and both flanges of both ends of the wide flange beams, the beams were turned sideways and over each wide flange beams and marked off, punching or centering was done by hand work.

In some wide flange beams the distance between both flanges is 150 to 1200 mm. These are used usually in building, constructions or the like. For example, in case that the distance between both flanges of the wide flange beam is 900 mm. and the length of the wide flange beam is 12 m., the weight thereof is 3.4 tons, and in case that the distance between both flanges of the wide flange beam is 1200 mm. and the length of wide flange beam is 12 m., the weight thereof is 8.0 tons. Accordingly, drilling the apertures one by one to form a plurality of bore holes for inserting the rivets or the bolts at a determined drilling positions, turning sideways and over a plurality of the wide flange beams of such size and weight by means of the said former method was very difficult and took much time, and the drilling work was very difficult and also inefficient.

It is an object of this invention to provide a multiple spindle drilling machine for wide flange beams in which a plurality of bores for inserting rivets or the bolts can be simultaneously, easily and efficiently drilled through the web and a pair of flanges at both ends of the wide flange beam.

It is another object of the present invention to provide a multiple spindle drilling machine in which the wide flange beam is fed by the feeding device and can accurately stopped at a predetermined drilling positions, and securely clamped at the position before the drilling and can be accurately drilled a plurality of bores at a suitable drilling position.

It is another object of the present invention to provide a multiple spindle drilling machine in which the wide flange beam can be rapidly and accurately fed at a predetermined drilling position in spite of heavy weight.

It is another object of the present invention to provide a multiple spindle drilling machine in which the wide flange beams can be accurately fed and clamped at various predetermined positions in spite of different distances between both flanges and can be accurately drilled a plurality of bores at a suitable drilling position.

It is another object of the present invention to provide a multiple spindle drilling machine which can fix a drilling position for the flange of a wide flange beam easily and accurately after measuring a distance from a central position of various wide flange beams of different sizes to a top edge of flange.

Still further objects of the present invention will become apparent from the following description taken together with the following drawings, in which.

It will be seen from the description of these drawings that this multiple spindle drilling machine comprises a supporting device mounted on the upper side of a machine table to support the wide flange beam, a feeding device positioned in front and rear of said machine table to feed the front and rear ends of the wide flange beam on a supporting device making the wide flange beam advance and retreat toward said supporting device, a stop device mounted on said machine table to stop the front and rear ends of the wide flange beam which is fed on the supporting device by said feeding device at a predetermined position, a clamp device mounted over said machine table to clamp firmly the front and rear ends of the wide flange beam stopped by said stop device at said drilling position and 3 pieces of drilling assemblies positioned to be movable toward a machine table over and on both sides of said machine table to drill a plurality of bores for inserting the rivets or the bolts through the web and both flanges of the front or rear ends of the wide flange beam clamped at a predetermined position on a supporting device by said clamp device.

Figure 1:
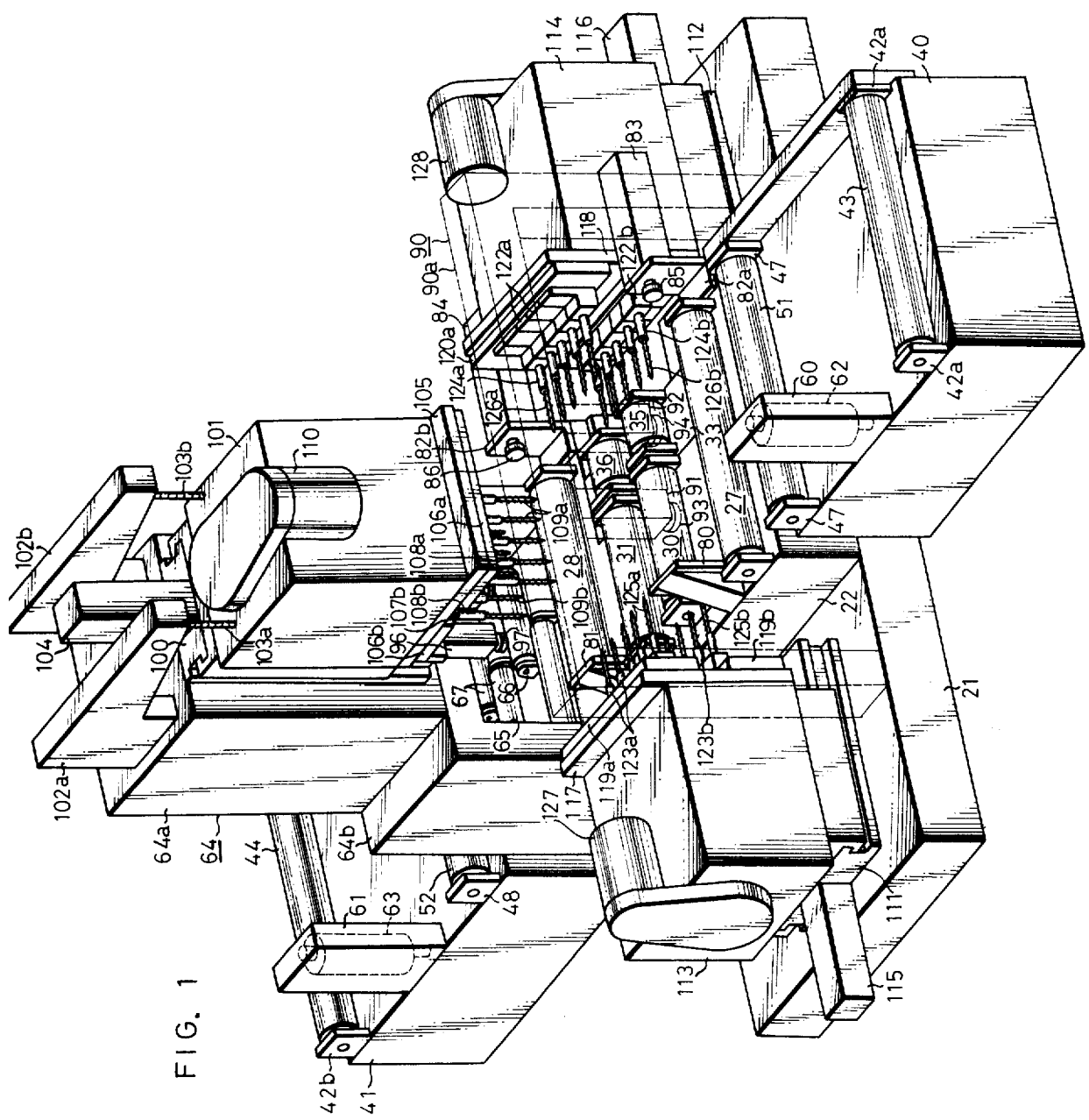
FIG. 1 is a perspective view of the multiple spindle drilling machine of the present invention.
Figure 2:
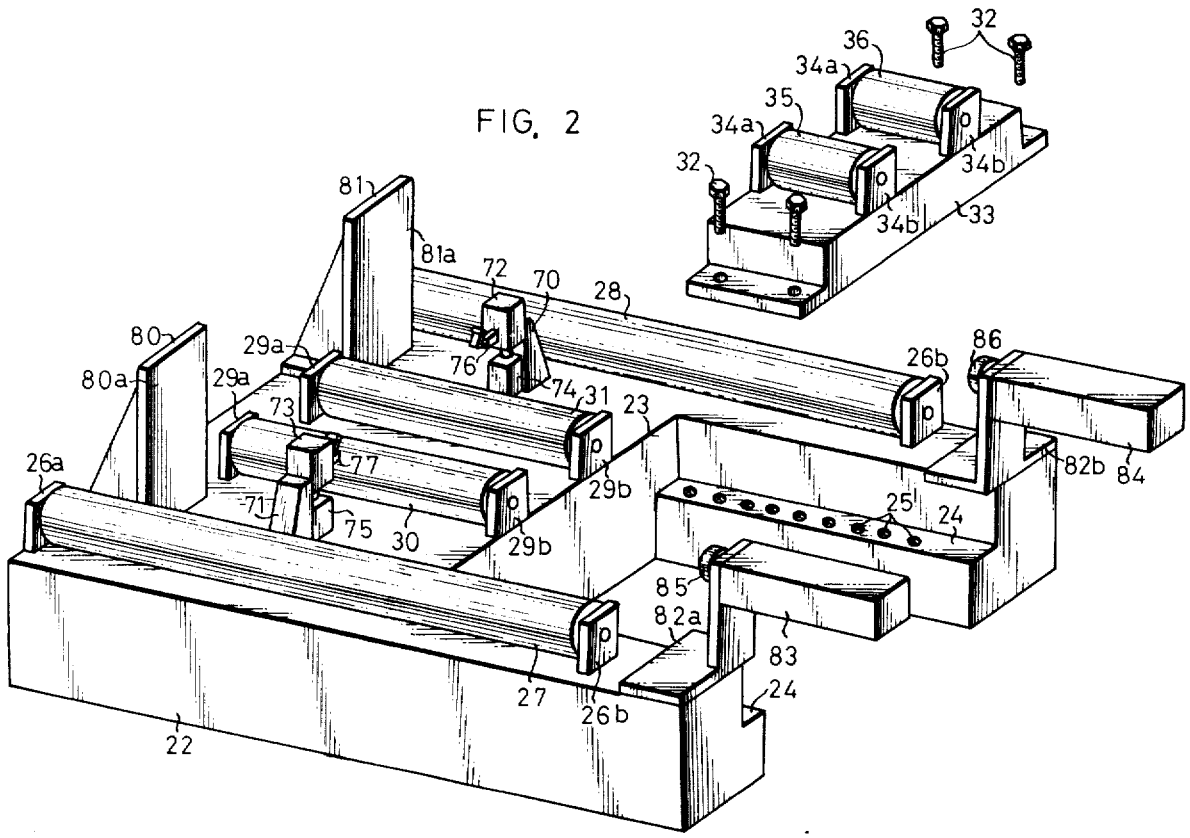
FIG. 2 is an enlarged perspective view of a supporting device to support wide flange beam mounted on the upper side of a machine table in FIG. 1.
Figure 3:
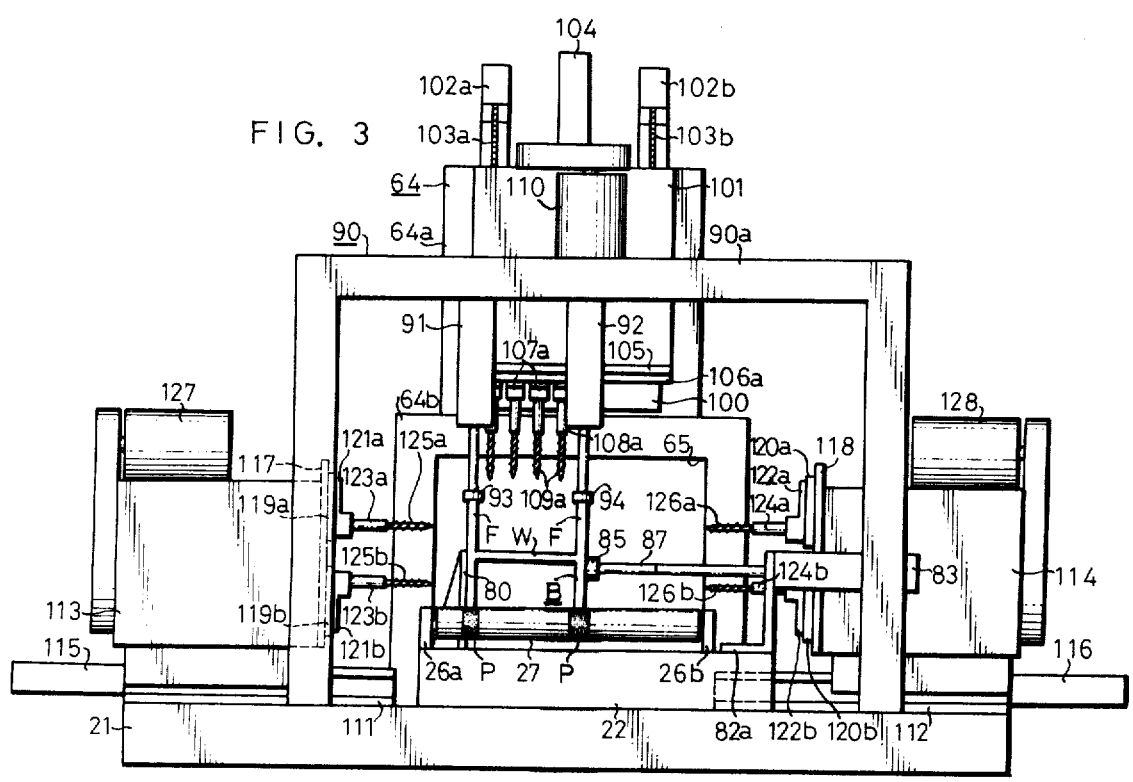
FIG. 3 is a front view of the multiple spindle drilling machine used in drilling the wide flange beam.

The arrangement shown in the drawing consists of a machine table 22 mounted near the middle front on the upper side of a bed 21 of the machine shown in FIG. 1, and a recess 23 is formed in the right side as seen from FIG. 2. The stepped sections 24 is formed in the inside facing the recess 23, and a plurality of tapped holes 25 are formed respectively toward the vertical direction in a regular distance on the upper face of each stepped sections 24. In the front and back ends of the upper face of said machine table 22, two long supporting rollers 27 and 28 are attached to rotate freely by means of spindle holder members 26a and 26b, and two short supporting rollers 30 and 31 are attached to rotate freely on upper side of the machine table 22 between the supporting rollers 27 and 28. And the each supporting rollers 27, 28, 30 and 31 becomes a horizontal supporting face supports the front end Bf and the rear end Br of the wide flange beam with a pair of parallel flanges F and web W connecting the center between the flange F horizontally on the supporting face as indicated in FIG. 3, 4 and 5.

Meanwhile, a subsidiary supporting stand 33 is attached so as to be put on and off through a plurality of bolts 32 between the stepped sections formed facing inside of the recess 23 as indicated in FIG. 2, and on the upper face of the subsidiary supporting stand 33, two pieces of short subsidiary supporting rollers 35, 36 are set to rotate freely on a pair of spindle holder member 34a and 34b be arranged on the same spindle line with short supporting rollers 30 and 31 on a machine table 22. And also, said subsidiary supporting stand 33 can be fixed to a desired setting position by selecting optionally a plurality of tapped holes 25 formed in said stepped sections 24 and screwing bolt 32 into the selected tapped holes 25, whereby the interval of supporting rollers 30, 31 on the said machine table 22 and subsidiary supporting rollers 35, 36 on subsidiary supporting stand 33 can be fixed in accordance with the distance between flanges F of the various wide flange beams of different sizes. Accordingly, the wide flange beam B, wherein the distance between both flanges F is longer than the length of the supporting rollers 30, 31 on machine table 22, is supported horizontally on said supporting face by means of the supporting rollers 27, 28, 30 and 31 on machine table 22 and the subsidiary supporting rollers 35 and 36 on the subsidiary supporting stand 33, and the wide flange beam B, wherein the distance between flanges F is shorter than length of the supporting rollers 30, 31 is supported horizontally on the the supporting side by means of supporting rollers 27, 28, 30 and 31 only, on machine table 22. In this case, the unnecessary subsidiary supporting rollers 35, 36 are taken out from recess 23 on the machine table 22 by detaching the subsidiary supporting stand 33 from the stepped sections 24 loosing the said bolt 32. Furthermore, on the periphery of each supporting rollers 27, 28, 30 and 31 on machine table 22 and the subsidiary supporting rolers 35, 36 on the subsidiary stand 33, the section F at the lower end of both flanges F of the wide flange beam also passes through and is treated as shown in FIG. 3 so as to prevent partial wear and tear of the supporting rollers 27, 28, 30, 31 and the subsidiary supporting rollers 35, 36.

Figure 4:
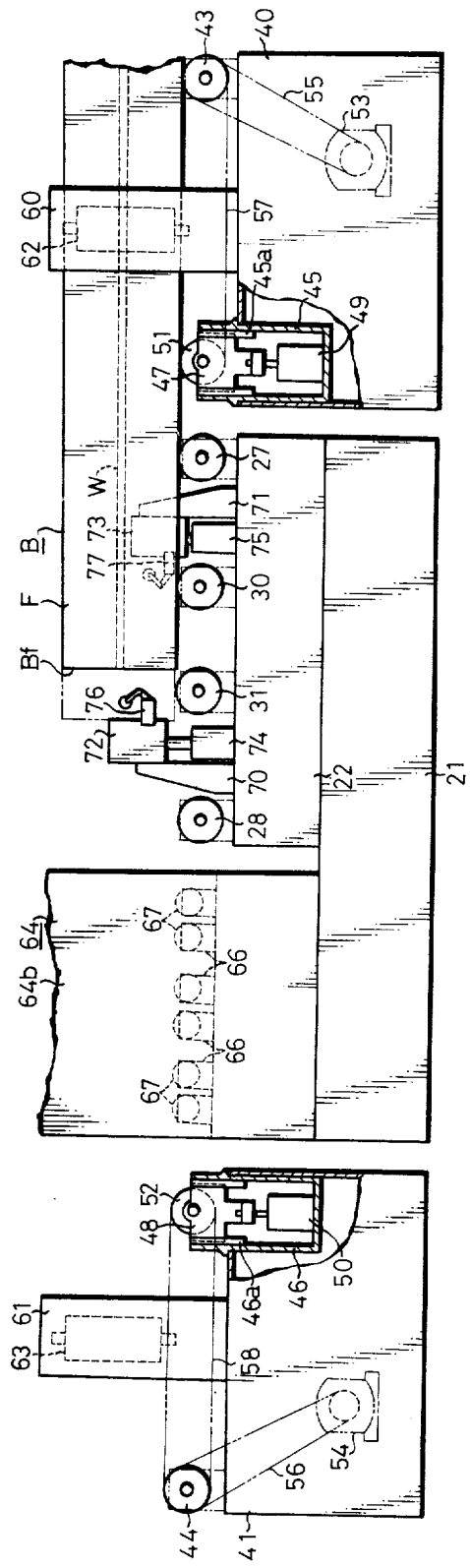
FIG. 4 is a sectional side view of a part of the machine used in drilling the wide flange beam.
Figure 5:
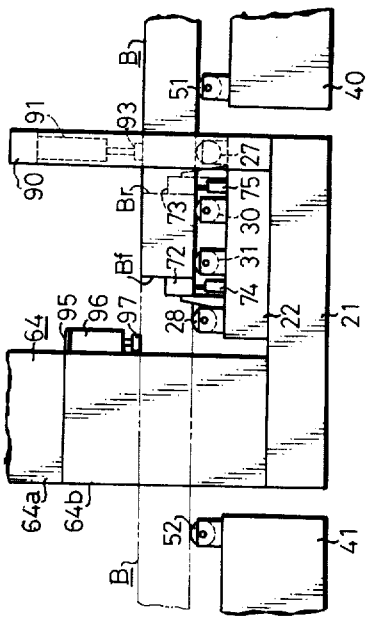
FIG. 5 is also a sectional abridgment side view of the machine used in drilling.

There are also first and second feeding devices to carry in the front end Bf or rear end Br of wide flange beam B on the rollers by advancing or retreating wide flange beam B toward supporting roller 27, 28, 30, 31 on machine table 22 and subsidiary supporting roller 35, 36 on subsidiary supporting stand 33 so that the machine box 40, 41 are disposed so as to face respectively the machine table 22 in front and rear of bed 21 as shown in FIGS. 1 and 4, and the feeding roller 43, 44 are so disposed as to rotate freely by means of a pair of spindle holder member 42a, 42b in the upper front end of the front machine box 40 and the back machine box 41. And also, on both sides of the upper back end of the front machine box 40 and of upper front end of the back machine box 41 each pair of supporting plates 45, 46 of the U-letter side is fixed, and guide section 45a, 46a are formed in the vertical direction inside of side walls facing supporting plates 45, 46. Between the side walls facing each supporting plate 45, 46 the spindle holder member 47, 48 is mounted so as to be movable up and down guided through the guide section 45a, 46a, and the spindle holder member 47, 48 are made to be lifted up by means of a cylinder device 49, 50 mounted in the bottom in inside of the supporting plate 45, 46. Between a pair of spindle holder member 47 mounted on both sides of the upper back end of the front machine box 40 and a pair of spindle holder member 48 mounted on both sides of the upper front end of the back machine box 41 the feeding rollers 51, 52 are set to rotate freely as shown in FIG. 1 and 4, and periphery of the upper end of feeding rollers 51, 52 is made to be a horizontal support connnecting the periphery of the upper end of the feeding roller 43, 44 and supporting roller 27, 28, 30, 31 on machine table 22 as shown in FIG. 4 when the spindle holder member 47, 48 are at down position.

And also, in both machine boxes 40, 41 the motors 53, 54 which are transferable for reverse rotation are disposed as shown in FIG. 4. The chains 55, 56 are hung between chain wheels fixed to a spindle of the motor and the ends of the spindle of one of the side feeding rollers 43, 44. The chains 57, 58 are hung between feeding rollers 43, 44 and roller 51, 52. Accordingly, where the feeding roller 43, 51 are turned counter clockwise in FIG. 4 through the chain 55, 57 by the motor 53 in the front machine stand 40, the wide flange beam B is advanced from the front of the machine and carried on supporting roller 27, 28, 30, 31 of machine table 22 as the front end Bf appears in solid line in FIG. 5, and in case that the feeding roller 44, 52 is turned in a clockwise rotation in FIG. 4 through the chains 56, 58 by the motor 54 in the back machine stand 41, the wide flange shape direction of motion is reversed from the back of the machine and carried on supporting roller 27, 28, 30, 31 of machine table 22 as the rear end Br in broken line in FIG. 5. And, when the feeding of both motors 53, 54 start, the spindle holder members 47, 48 are moved up and the feeding rollers 51, 52 are lifted up a little from the supporting face, so that the lower end of the flange F of the wide flange beam is contacted by the periphery of the feeding roller 51, 52 and the feeding of wide flange beam is done smoothly.

The device which lifts up the feeding rollers 51, 52 need not be mounted at both ends of the spindle holder of rollers 51, 52, but can be mounted at the one end of the spindle holder of each feeding roller 51, 52. In this case as the feeding rollers 51, 52 are lifted at the one end, they will slope.

In order to carry the wide flange beam B to a predetermined position on the supporting rollers 27, 28, 30, 31 the setting frame 60, 61 is built as shown in FIGS. 1 and 4. and the guide rollers 62, 63 are set to setting frames 61, 62 vertically to rotate freely. Accordingly, various wide flange beams B in different sizes are guided on the periphery of the left side flange F through the said guide rollers 62, 63 and carried leaning toward the left on supporting roller 27, 28, 30, 31 on the upper face of the machine table 22 by means of the first and second feeding devices. And also, supporting frame 64 built in the back end of the center on the upper face of the bed 21 in back of the machine table 22 has the upper frame 64a and the lower frame 64b as shown in FIG. 1, 3 and 4, and in the lower frame 64b the passage hole 65 is so formed as to permit passage of the wide flange beam B. And, in the bottom of the passage hole 65 as shown in FIG. 1 and 4, many of the subsidiary feeding rollers 67 are set in the left and right sides alternately are held by a pair of the spindle holder member 66, and the upper end of the periphery of each roller 67 is made to be with a horizontal supporting face connecting the upper end of the periphery of supporting roller 27, 28, 30, 31 on the upper face of the machine table 22. The feeding of the wide flange beam between the supporting roller 27, 28, 30, 31 on the upper face of the said machine table 22 and feeding roller 44, 52 on the upper face of the back machine box 41 is thus guided by means of these subsidiary feeding rollers 67.

The first and second stopping devices stop the front end Bf and the rear end Br of the wide flange beam B carried on supporting rollers 27, 28, 30, 31 on the upper face of the machine table 22 through first and second feeding devices as shown especially in FIG. 2, 4 and 5. The supporting blocks 70, 71 are mounted so as to be movable left and right between the supporting rollers 28, 31 and the supporting rollers 27, 30 on the upper face of machine table 22, and in front of the back supporting block and in back of the front supporting block 71 stopping member 72, 73 are supported so as to be movable up and down, under said stopping members 72, 73 the cylinder devices 74, 75 are mounted on the upper face of foundation and move up and down. And also, in front of the back stopping member 72 and in back of the front stopping member 73 the limit switches 76, 77 are mounted to control motors 53, 54 of the first and second feeding devices. Accordingly, in case motor 53 is driven and the front end of the wide flange beam is carried in on supporting rollers 27, 28, 30, 31 from the front of machine, the back cylinder device 74 works and back stopping member 72 is moved up to a possible position in order to contact the front end or web w of the wide flange beam. So, when the front end Bf of wide flange beam B is carried on the supporting roller 27, 28, 30, 31 and comes near a rising position of the stopping member 72, the front end of the web w contacts the front of stopping member 72, as shown in solid line in FIG. 5, and the front end Bf of the wide flange beam is stopped at a predetermined drilling position, and at the same time the limit switch 76 is worked by contacting the front end of the web w and stops motor 53 of the first feeding device. On the other hand, in case motor 54 of the second feeding device drives, and the rear end of wide flange beam B is carried in on the supporting rollers 27, 28, 30, 31 from the back of the machine, the front cylinder 75 works and the front stopping member 73 is moved up to a possible position in order to contact the rear end of the web w of wide flange beam B as shown in broken line in FIG. 5. So, when the rear end Br is carried on the supporting rollers 27, 28, 30, 31 and comes near a rising position of the stopping member 73, the rear end of web w contacts the back face of stopping member 73 and the rear end Br of the wide flange beam B is stopped at a predetermined drilling position and at the same time the limit switch 77 connects the rear end of web w and is worked and stops motor 54 of the second feeding device as shown in the broken line in FIG. 5.

In order to clamp the front end Bf and the rear end Br of wide flange beam B stopped on supporting roller 27, 28, 30, 31 by means of the first and second stop device at the drilling position the clamping arrangement controls the move of the left and right of the front end Bf and the rear end Br of wide flange beam B. There is a clamping device to control the move of the upper and lower direction of the front end Bf of wide flange beam B, and a clamping device to control the move of the upper and lower direction of the rear end Br of the wide flange beam B. Regarding the first clamping device shown in FIGS. 1, 2 and 3 a pair of regular members 80, 81 are built respectively at the left end on the upper face of machine table 22 between the supporting rollers 27, 30 and supporting rollers 28, 30, 31. The regular members 80, 81 have a regular face 80a, 81a corresponding to the right side periphery of the guide rollers 62, 63 on the said first and second feeding devices in the right side thereof and are made to control the front end Bf or the rear end Br of the wide flange beam B at a predetermined position on supporting roller 27, 28, 30, 31 by contacting the outside of the left side flange F of the wide flange beam B to be guided and fed by each guide roller 62, 63 on supporting rollers 28, 30, 31. On the other hand, at the right end on the upper face of the said machine table 22 a pair of the cylinder devices 83, 84 are mounted facing the regular member 80, 81 through the setting plate 82a, 82b, and at the top end of the press rod, press member 85, 86 are disposed. Accordingly, in case that the front end Bf or the rear end of the wide flange beam B is stopped at a predetermined position on supporting roller 27, 28, 30, 31 by means of the first or second stopping devices, the cylinder devices 83, 84 work, and at the same time press member 85, 86 are moved left and contact the outside of the right side flange F, and the front end Bf or the rear end Br of wide flange beam B is put between the regular face 80a, 81a of regular members 80, 81 and press members 85, 86. Still, in case of drilling a wide flange beam B where the distance between both flanges F is short, an extension rod 87 is attached to the top end of the press rod of cylinder devices 83, 84 as shown in FIG. 3 and press members 85, 86 are adjusted to contact the outside of the right side flange F of wide flange beam B.

With regard to the second and third clamping device shown in FIGS. 1, 3 and 5, there is a setting frame 90 of a reverse U-letter form as the crossing machine table 22 is mounted at the front end on the upper face of bed 21 and on the lower face of the side frame 90a a pair of cylinder devices 91, 92 is mounted to be movable left and right. At top end of press rod of the cylinder devices 91, 92 press member 93, 94 are mounted to contact the upper end of the both flanges F of wide flange beam B as shown in FIG. 3. Accordingly, in case the front end Bf of the wide flange beam B is stopped at a predetermined position supporting rollers 27, 28, 30, 31 with the first stopping device, the cylinder devices 91, 92 work, press members 93, 94 are moved down and contact the upper end of the both flanges F of wide flange beam B. Consequently, the front end Bf of wide flange beam B is put between supporting rollers 27, 28, 30, 31 and press members 93, 94 as shown in FIG. 3. Meanwhile, on front face of the lower frame 64b of the supporting frame 64 setting plate 95 is mounted jutting out as shown in FIG. 1 and 5, and on the lower face of the setting plate a pair of cylinder devices 96 are mounted to be movable left and right. And, at the top end of the press rod cylinder device 96, press member 97 which can contact the upper end of the both flanges F of wide flange beam B is set in the same way as the press members 93, 94. Accordingly, in case that the back end Br of wide flange beam B is stopped at a predetermined position on supporting rollers 28, 30, 31 by means of the second stopping device, the cylinder device 96 operates, each press member 97 is moved down and contacts the upper end both flanges F of the wide flange beam B. Consequentlty, the rear end Br of wide flange beam B is put between the supporting roller 27, 28, 30, 31 and press member 97 as indicated in broken line in FIG. 5.

Figure 6:
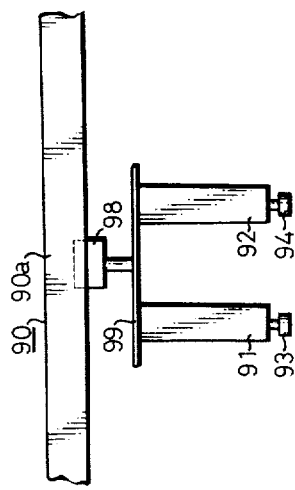
FIG. 6 is a sectional front view showing another embodiment of a clamp device to clamp the wide flange beam at a predetermined position by pressing it on a supporting device.

The clamping device can be attached as shown in FIG. 6 in addition to the aforementioned embodiment. For example, rolling member 98 is set to be movable left and right on the lower face of side frame 90a of the setting frame 90 and the setting plate is supported hanging on the face of rolling member 98. And, a pair of cylinder devices 91, 92 are mounted so as to be movable left and right on the lower face of the said setting plate 99 and at the top end of the press rod of cylinder devices 91, 92 press members 93, 94 are set to put the front end Bf of the wide flange beam B between supporting roller 28, 30, 31 contacting the upper end of both flanges F of wide flange beam the same as heretofore mentioned. Cylinder device 96 of the third clamping device can be attached in the same manner.

Drilling assemblies are provided to drill at one time a plurality of apertures inserting the rivets or bolts through web w and a pair of flanges F of the front end Bf and the rear end Br of the wide flange beam B clamped at a predetermined drilling position on supporting rollers 27, 28, 30, 31 by means of the clamping devices. These assemblies consist of the first drilling assembly to drill a plurality of apertures through the web w of wide flange beam B, the second drilling assembly to drill a plurality of apertures through the left side flange F of wide flange beam B and the third drilling assembly to drill a plurality of apertures through the right side flange F of the wide flange beam B. The first drilling assembly arrangement includes a gear box 101 attached so as to be moveable up and down at the front end of a guide member 100 which is fixed on the front edge of the upper frame 64a of the supporting frame 64 as prescribed in FIG. 1 and FIG. 3. A pair of supporting arm 102a, 102b are fixed on the upper frame 64a and between the front edge of the supporting arm 102a, 102b and the said gear box 101, chains 103a and 103b are attached and gear box 101 is hung up by chain 103a, 103b as not to drop down by its weight. On the front end of the upper frame 64a, cylinder device 104 is fixed and the gear box 101 is transferred down toward the front end Bf or the rear end Br supported on supporting rollers 27, 28, 30, 31 on the machine table 22 by motion of cylinder device 104. On the lower top and the lower end of fixing plate 105 at the bottom of the said gear box 101, a pair of movable plate 106a, 106b are disposed so as to be movable back and forth as specified in FIG. 1 and FIG. 3. On the bottom of the movable plates 106a, 106b, plural supporting blocks 107a, 107b are disposed so as to be movable right and left. In drill chuck 108a, 108b jutting out of the bottom of the supporting blocks 107a, 107b, drills 109a, 109b are disposed so as to allow attaching or taking off and drills 109a, 109b can be moved by motor 110 at the front of the said gear box 101 through the gear driving system in the gear box 101 and plural bores can be drilled at the same time on the web w of wide flange shape supported on supporting roller 27, 28, 30, 31.

Regarding the second and the third drilling assemblies. Guide members 111, 112 are in the center of and at the upper face of bed 21 on both sides of the machine table as shown in FIG. 2 and FIG. 3. Gear boxes 113, 114 are mounted on guide members 111, 112 to be moveable right and left. Said gear box 113, 114 can be moved toward the front end Bf or the rear end Br of the wide flange beam B which is supported on rollers 27, 28, 30, 31 on machine table 22. As shown in FIG. 1 and FIG. 3. a pair of movable plate 119a, 119b, 120a, 120b are mounted so as to be movable up and down in the inner upper side and inner lower side of setting plate 117, 118 which are disposed along the diagonal inner face of each gear box 113, 114. In the inner face of movable plates 119a, 119b, 120a, 120b, supporting block 121a, 121b, 122a, 122b are mounted and can be moved back and forth. And drills 125a, 125b, 126a, 126b are attached to drill chucks 123a, 123b, 124a, 124b which jut out of the inner faces of the supporting blocks 121a, 121b, 122a, 122b. These drills are all driven at one time as well as the drills 109a, 109b of the first drilling assembly with motors 127, 128 mounted on the outer side of gear boxes 113, 114 through gear a driving system in the gear boxes 113, 114. A plurality of bores are drilled at the same time on both flanges F of wide flange beam B which are supported on rollers 27, 28, 30, 31. When the wide flange beam with a short flange F is drilled, gear box 114 of the third drilling assembly is used and the supporting stand is eliminated from the recess 23 on the right hand side of machine table 22 or supporting stand 33 is set at the back of the recess 23, the gear box 114 is entered into the recess 23 and a plurality of bores are made on flange F at the right hand side of wide flange beam B by many drills 126a, 126b.

In case of drilling a plurality of bores for inserting the rivets or the bolts on the front end Bf and the rear end Br of wide flange B through the multiple spindle drilling machine, the setting position of supporting stand 33 in the recess 23 at the right hand side of machine table should be adjusted right and left or the supporting stand 33 should be eliminated from the recess 23 by first setting the distance between both flanges F as the lower end of both flanges F are supported by supporting rollers 27, 28, 30, 31 on machine table 22 and subsidiary supporting rollers 35, 36 on supporting stand 33. Next stopping members 72, 73 of the first and the second stopping devices should be adjusted to the front end or the rear end of the web of the wide flange beam B, supporting blocks 70, 71 should be regulated right and left on machine table 22. Furthermore, the clamping device which controls the move of the front end Bf and the rear end Br of wide flange beam B in the left and right directions is disposed so that the press members 85, 86 may make contact with the outer sides of both flanges F of the wide flange beam, especially in case of drilling a wide flange beam B with a short distance between both flanges F thereof, the length should be adjusted by adding extension rod 87 to the press rod of cylinder devices 83, 84 as shown in FIG. 3. The clamping device which controls movement of the front end Bf or the rear end Br of the wide flange beam B in the up and down direction is made so that the press members 93, 94, 97 may be positioned to make contact with the upper end of both flanges F of the wide flange beam B. Cylinder devices 91, 92, 96 are disposed left and right along the side frame 90a of setting frame 90 or the front setting plate 95 of supporting frame 64 in accordance witht the distance between flanges F. As for the first, second and third drilling assemblies, the positions of the movable plates 106a, 106b, 119a, 119b, 120a, 120b against each setting plate 105, 117, 118 are adjusted so that the drills 109a, 109b, 125a, 125b, 126a, 126b may be arranged at predetermined positions on both flanges F and web W of the front end Bf or the rear end Br of the wide flange beam, and setting positions of supporting blocks 107a, 107b, 121a, 121b, 122a, 122b for the movable plates are adjusted. Drills not in use should be eliminated from the drill chucks.

In this way, after regulating each device and the assemblies in accordance with the size of wide flange beam B, the beam B is placed on feeding rollers 43, 51 of the first feeding device established in front of machine table 22 and outer side of the left flange F of wide flange beam B is contacted with guide roller 62. When the hand switch not shown in the drawing is closed, motor 53 of the first feeding device begins to drive and the feeding roller 43, 51 are rotated clockwise in FIG. 4 through chains 55, 57.

At the same time, cylinder device 49 of the first feeding device is moved, spindle holder member 47 of feeding roller 51 is moved in the upper direction along guide member 45a of supporting plate 45 and the feeding roller 51 is lifted a little higher than supporting rollers 27, 28, 30, 31 on machine table 22.

Accordingly, the peripheral face of the feeding roller 51 is contacted with lower end of flange F and wide flange beam B is smoothly carried in on supporting rollers 27, 28, 30, 31 on the upper side of machine table 22. The feeding roller 51 is moved by cylinder device 49 only when the wide flange beam B is fed and is brought back to its original place after the feeding operation. When driving, the first stopping device and cylinder device 74 are moved and stopping member 72 and limit switch 76 are transferred where they contact the front end of the web W of the wide flange beam B as specified in FIG. 4. Consequently, the front end of the web W of the wide flange beam B which is carried in on the supporting rollers 27, 28, 30, 31 is made to contact with stopping member 72 of the first stopping device as shown in the solid line in FIG. 5, the motion of wide flange beam B is stopped and limit switch 76 is enabled by the front end of web W and motor 53 of the said feeding device is stopped. Accordingly, the front end of wide flange beam B is stopped at a predetermined position on the said supporting rollers 27, 28, 30, 31.

In this way, when the front end of wide flange beam B is stopped at a predetermined position, cylinder devices 83, 84 of fixing device are operated, press members 85, 86 are moved toward the left hand side and are contact the outside face of flange beam B and wide flange beam B is pressed toward the left direction. Therefore, the front end Bf of wide flange beam B is firmly clamped in order not to be moved right and left between the press members 85, 86 and controlling members 80, 81 as shown in FIG. 3. Simultaneously with the moving of the cylinder devices 83, 84, cylinder device 91, 92 of another clamping devices is moved, press members 93, 94 are transferred toward the lower direction and contact the upper ends of both flange F of the wide flange beam B and press the wide flange beam B down. Accordingly, the front end Bf of wide flange beam B is firmly clamped in order not to move up and down between the press members, 93, 94 and supporting rollers 27, 28, 30, 31 as specified in FIG. 3. After that, motors 110, 127, 128 of the first, second third assemblies start and drills 109a, 109b, 125a, 125b, 126a, 126b are rotated at the same time, cylinder devices 104, 115, 116 of each drilling assembly are moved and each gear box 101, 113, 114 are moved toward the front end Bf of wide flange beam B. Therefore, a plurality of bores for inserting the rivets or bolts are made at the same time at a predetermined position through web W of the front end Bf of the wide flange beam B and both flanges F by the drills 109a, 109b, 125a, 125b.

In the case of drilling a wide flange beam B with a short flange F, the third drilling assembly is made to be movable toward the left hand side from the recess 23 to gear box 114, for supporting stand 33 is eliminated from the recess 23 on the right hand side of machine table 22 or supporting stand 33 is set at the back of the recess 23, gear box 114 enters into the recess 23 and by many drills 126a, 126b which are in it, bores are made on flange F on the right hand side of wide flange beam B.

After drilling the front end Bf of wide flange beam B, gear boxes 101, 113, 114 of each of the drilling assemblies is returned to the former position by returning work of cylinder devices 104, 115, 116 and drills 109a, 109b, 125a, 125b, 126a, 126b are stopped as motors 110, 127, 128 are stopped. At the saame time, press members 85, 86, 93, 94 are returned to former positions by the returning work of cylinder devices 83, 84, 91, 92 of each clamping device and the lock of the front end Bf of wide flange beam B is released. After cylinder device 74 of the first stopping device is returned manually or automatically, stopping member 72 is moved down, a connection to the front end of the web W of the wide flange beam B is released and at the same time, limit switch 76 is released from the front end of web W and is closed.

Consequently, motor 53 of the first feeding device is started again and feeding rollers 43, 51 are rotated counterclockwise in FIG. 4. At the same time, motor 54 of the second feeding device is started to move and feeding rollers 44, 52 are rotated counterclockwise in FIG. 4 through chain 56, 58. When the feeding device is started, feeding rollers 51, 52 are lifted up by cylinder devices 49, 50.

Accordingly, wide flange beam B is moved to the back of the machine from the position indicated in the solid line in FIG. 5 through supporting rollers 27, 28, 30, 31 on machine table 22, the feeding roller 67 in supporting frame 64 and feeding rollers 44, 52 on machine box 41.

If the manual switch is closed when wide flange beam B is fed toward the back and the rear end Br passed on the second stopping device, the second forwarding motor 54 is driven backward and the feeding rollers 44, 52 are rotated clockwise in FIG. 4. On starting of this backward rotation, the feeding roller 52 is lifteed up by cylinder device 50 as well as the case. Accordingly, wide flange beam B is fed on supporting rollers 27, 28, 30, 31 on machine table 22 from the back of the machine by the feeding rollers 44, 52 of the second feeding device.

On the other hand, on starting of the said backward rotation, cylinder device 75 of the second stopping device is moved and stopping member 73 and limit switch 77 are moved upward to a position at which they can make contact with the rear end of the web W of the wide flange beam B as shown in broken line in FIG. 5. Consequently, the rear end of web W of the wide flange beam B which is fed on the supporting roller 27, 28, 30, 31 is made to contact with the stopping member 73 as prescribed in broken line in FIG. 5, feeding motion of the wide flange beam B is stopped, limit switch 77 is enabled in contact with the rear end of the web W and motor 54 of the second feeding device is stopped. Accordingly, the rear end Br of the wide flange beam B is stopped at a predetermined position on the supporting rollers 27, 28, 30, 31.

In this way, when the rear end Br of the wide flange beam B is stopped at a predetermined drilling position, cylinder devices 83, 84 of the clamping device are operated as well as in the case of the front end Bf, press members 85, 86 are moved toward the left direction and the rear end Br of the wide flange beam B is firmly clamped in order to move right and left between press members 85, 86 and controlling member 80, 81. And also, cylinder device 96 of another clamping device is operated with movement of the cylinder device 96, press member 97 is moved toward the lower direction and contacts the upper end of both flanges F of wide flange beam B toward the lower direction. Accordingly, the rear end Br of the wide flange beam B is firmly clamped in order not to move up and down between the press member 97 and supporting rollers 27, 28, 30.

After that, as well as in the case of the front end Bf of the wide flange beam B, motors 110, 127, 128 of the first, second and third assemblies are started, drills 109a, 109b, 125a, 125b, 126a, 126b are rotated, cylinder assemblies are worked and each gear box 101, 113, 114 is moved toward the rear end Br of the wide flange beam B.

Consequently, a plurality of bores for inserting the rivets or the bolts are drilled at predetermined positions on the web W at the rear end Br of the wide flange beam B and the both flanges F of the wide flange beam B.

After the work of drilling the rear end Br of the wide flange beam B, gear boxes 101, 113, 114 of each drilling assemblies are returned to their former position by the returning motion of cylinder devices 104, 115, 116, motors 110, 127, 128 stop and drills 109a, 109b, 125a, 125b, 126a, 126b are also stopped. At the same time, press member 85, 86, 97 are returned to their former position by the returning motion of cylinder devices 83, 84, 96 of each clamping device and the lock of the rear end Br of the wide flange beam B is undone. And then, when the returning motion of cylinder device 75 of the second stopping device is done manually or automatically, the stopping member is moved downward, a connection to the rear end of the web W of the wide flange beam B is released and limit switch 77 is released from the rear end of the web W and is closed.

Then motor 54 of the second feeding device is started again and feeding rollers 44, 52 are rotated toward clockwise in FIG. 4. Furthermore, motor 53 of the first feeding device is also started and feeding rollers 43, 51 are rotated clockwise. And also, on starting of this cycle, feeding rollers 51, 52 are lifted up by means of cylinder device 49, 50 as well and torque to be taken on starting is reduced. Accordingly, the wide flange beam B is fed to the front of the machine from a position indicated in a broken line in FIG. 5 through supporting rollers 27, 28, 30, 31 on the upper face of machine table 22 and the feeding roller on machine box 40 and then the drilling motion to the front end Bf and the rear end Br of the wide flange beam B is finished. Then, when this wide flange beam is taken out, only motor 54 of the second feeding device is started in reverse to the foregoing by work of the limit switch 77, and if feeding rollers 44, 52 are assembled to be rotated counterclockwise in FIG. 4, the wide flange beam B can be taken out from the position indicated in the broken line in FIG. 5 to the back of machine.

The second embodiment of this invention is explained in FIG. 7 to FIG. 11. But, regarding the components which are the same or similar to the first embodiment, the same part numbers mentioned in connection with said embodiment are used and the explanation thereof is shortened, and only in this case of different components to the first embodiment, the explanation is given.

Figure 7:
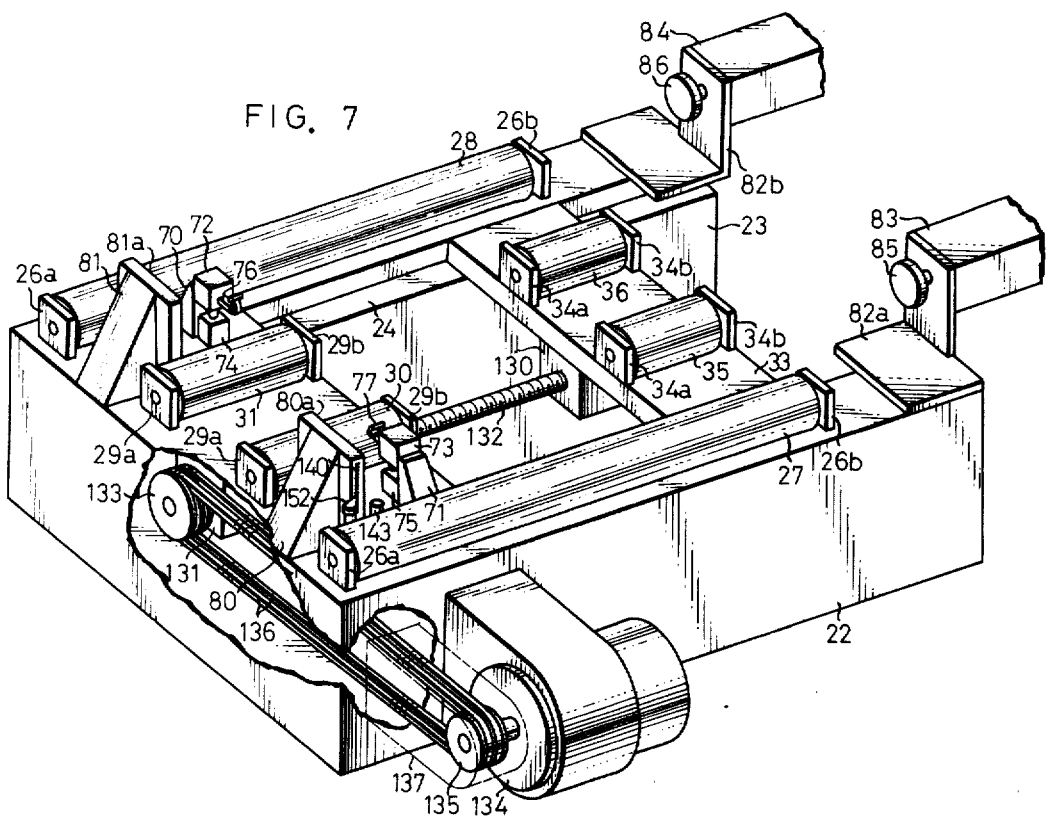
FIG. 7 is a sectional broken perspective view showing another embodiment of a supporting device and a subsidiary supporting device to support the wide flange beam.
Figure 8:
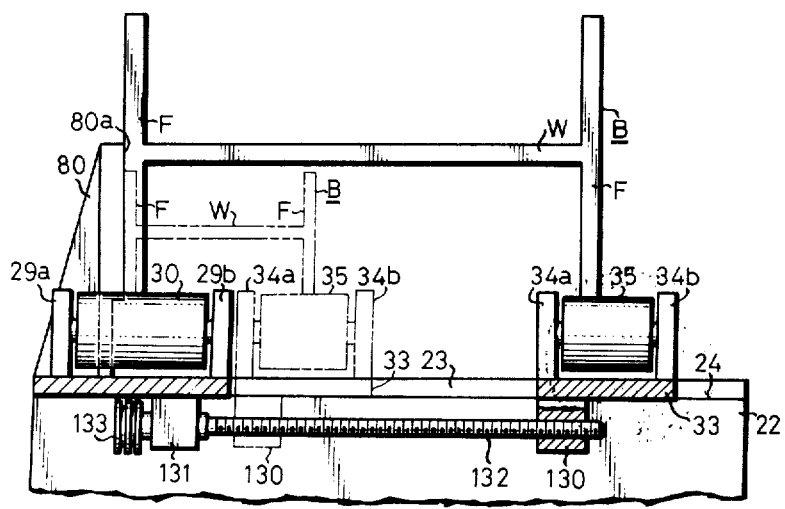
FIG. 8 is a front sectional view of the main section in FIG. 7.

Another embodiment for the subsidiary supporting device mounted in recess 23 on the right hand side of machine table 22 is indicated in FIG. 7 and 8. In this embodiment, subsidiary supporting stand 33, on the upper face of which a pair of subsidiary supporting rollers 35, 36 are located is not fixed between stepped section 24 in recess 23, but placed so as to be able to roll left and right. And at the center position on the lower face of this subsidiary supporting stand 33 tapped plate is formed toward the direction of rolling. On the other hand, at the center position of the left side on the lower face of machine table 22 thread mandrel 132 is set so as to be rotary, driven pulley 133 is fixed at the left end of the thread mandrel 132 and the right end thereof is connected with the inside of the tapped hole of the said tapped plate for connecting. The motor is fixed near the left side in front of machine table 22 and a pair of belts 136 are hung between drilling pulley 133 set on the top end of the spindle of the motor and driven pulley 133 on the top end of the thread mandrel 132. The exposed section of driving pulley 135 and the belt 136 from machine table 22 is covered with cover 137.

Accordingly, in case of drilling a plurality of bores for inserting the rivets or the bolts on the front end Bf and the rear end Br of wide flange beam B through the multiple spindle drilling machine with this assembly, motor 134 is rotated right or left in accordance with distance between flanges F before the drilling so that the upper ends of flanges F of wide flange beam B to be drilled may be supported on supporting rollers 27, 28, 30, 31 on machine table 22 and subsidiary supporting rollers 35, 36 on the supporting stand 33.

Owing to the above, the thread mandrel 132 is rotated right or left through driving pulley 135, belt 136 and driven pulley 133 and the subsidiary supporting stand 33 is adjusted in the right or left direction in recess 23. So, in the machine of this embodiment, the position of the subsidiary supporting rollers 35, 36 can be more easily adjusted than in the case of the first embodiment.

Next, FIGS. 7, 9, 10 and 11 will show the assembly of the measuring device which is assembled to adjust the easily drilling position of both flanges F by means of the second and third drilling assemblies mounted in the left and right side on machine table 22 in accordance with the distance after measuring the distance from the center of web W of wide flange beam to one side end of flange F.

This measuring device decides the drilling position of both flanges F in such a way as X mm from the center of web W to the upper and lower direction, even if the length of the upper and lower flange F divided by the center of web W of wide flange beam B is different due to error in manufacturing, drilling can be accurately done at a predetermined position of both flanges F, and in the buildings, constructions or the like, in case of connecting a plurality of wide flange beam B together, the top bores will coincide with the bores made on a splice plate when the drilling position for both flanges F of wide flange beam B was determined as X mm from the upper end and the lower end of flange F.

Figure 9:
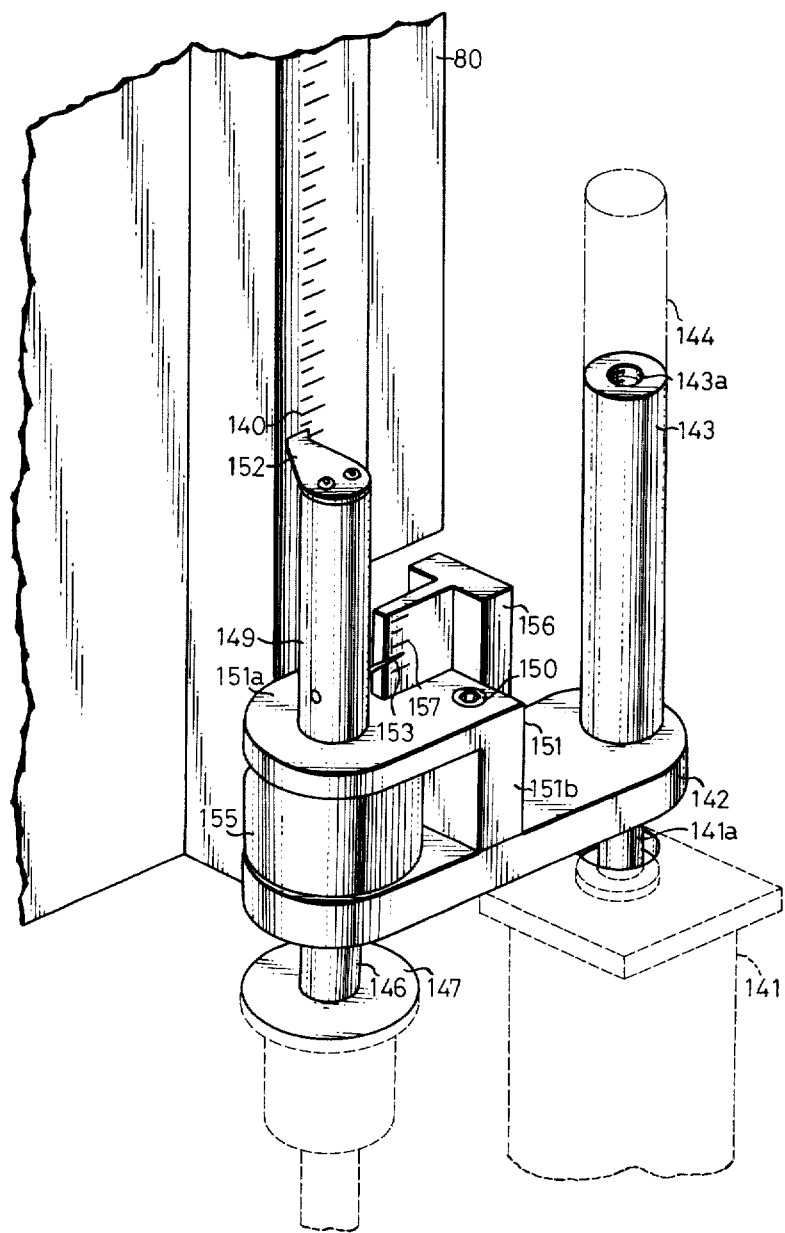
FIG. 9 is a sectional enlarged perspective view of the measuring device in FIG. 7.
Figure 10:
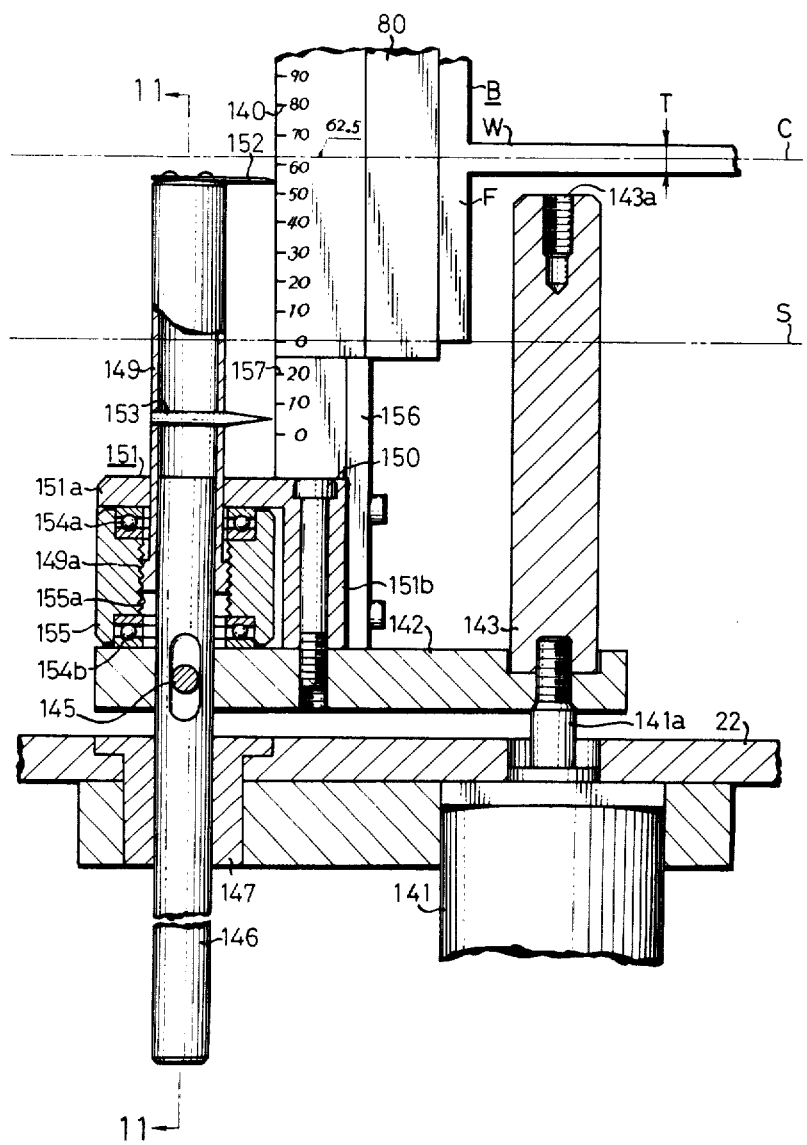
FIG. 10 is a front sectional view sectioned in the center of a measuring device shown in FIG. 9.

A main scale 140 is attached on the front of controlling member 80 established in the left top of machine table 22 as shown in FIGS. 7, 9 and 10 in this embodiment, with a cardinal point O determined by a supporting face S at the top of periphery of supporting rollers 27, 28, 30, 31. Cylinder device 141 in said machine table 22 is mounted at the foot of web W of the wide flange beam B supported by supporting roller 27, 28, 30, 31 next to controlling member 80 with this main scale an end of supporting plate 142 is fixed at the top end of lifting rod 141a jutting out on machine table 22 as shown in FIGS. 9 and 10, and also detection member 143 is moved upward toward the web W of the wide flange beam B from the lower standard stopping position through the work of cylinder device 141 and is stopped when its top end reaches the bottom og the web W. And also, on the top of the said detection member 143, a connecting hole 143a is made and extention rod 144 is connected to add the length according to size of wide flange beam B as shown in FIG. 9.

Figure 11:
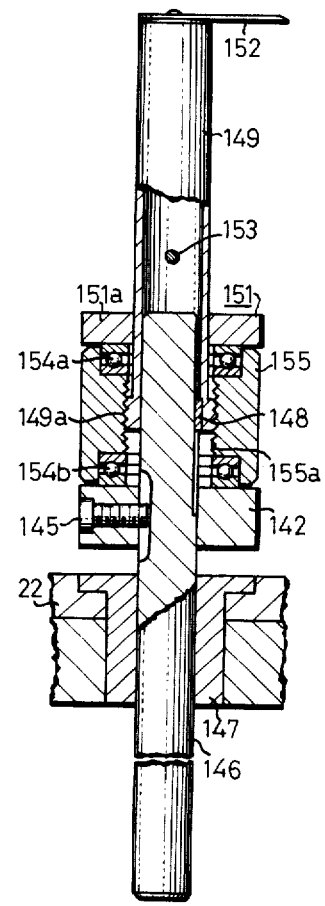
FIG. 11 is a sectional view taken on line 11—11 in FIG. 10.

Rolling mandrel 146 is set to be movable in the upper and lower direction by bolt 145 passing through another end of the supporting plate 142 and inserted into guide member 147 mounted at a counter-position of the machine table 22 as shown in FIGS. 10 and 11 and the supporting plate 142 is made to be moved toward the direct upper direction in the horizontal direction without rolling or sloping as a center of lifting rod 142 is moved upward by cylinder device 141. At the top end of the rolling mandrel 146, indicating cylinder 149 is connected so as to be movable up and down through slide key 148 as shown in FIG. 11 and the indicating cylinder 149 is supported to be movable up and down through bolt 150 fixed on the upper face of the supporting platet 142 passing through side frame 151a of holding frame 151, the front of which is in almost a reverse lettter L-shape asa shown in FIG. 10. At the top of the indicating cylinder 149, a main indicator facing to main scale 140 is attached and in the center of it, a vernier 153 is attached.

Accordingly, the main indicator 152 is moved toward the upper direction from point O, the standard indicating position on main scale 140 with supporting plate 142, mandrel 146 and indicating cylinder 149 in accordance with the movement toward the upper direction of detection member 143 and indicates the distance from the end of the flange F of the wide flange beam B to the bottom of web W on main scale 140 according to the measure of movement of detection member 143.

And also, between side frame 151a of the holding frame 151 and supporting plate 142, a regulating knob is set to be rotative around the lower end of the indicating cylinder 149 through a pair of bearings 154a, 154b and made so that male screw 149a formed at the lower end of the periphery of the said indicating cylinder 149a may be mate with female threads 155a formed inside of this regulating knob. Accordingly, when the said regulating knob 155 is rotated, the indicating cylinder 149 is moved up and down on the upper end of the rolling mandrel 146 guided with a slide key 148 without rotating. On the other hand, in the side of vertical frame 151b of the holding frame 151, a scale plate for regulation is set as indicated in FIGS. 9 and 10 and in the one side thereof a scale for regulation 157 is attached facing the vernier set in the center of the indicating cylinder 149 so that the vernier 153 may indicate cardinal points O when the main indicator 152 corresponds with the upper end of detection member 153.

Accordingly, if the standard indicating position of main indicator 152 is raised half the thickness according to the thickness T of the web W of the wide flange beam B through this vernier 153 and subscale 157 before measuring, the distance which the main indicator 152 indicates on main scale 140 is from the center position C of the web W of the wide flange beam B to the end of the flange F as shown in FIG. 10, that is, distance to the supporting face S.

Meanwhile, in the multiple spindle drilling machine with the measuring device assembled in this way, in the case of adjusting the drilling positions against both flanges F of wide flange B, first, the thickness T of the web W of the wide flange beam B should be measured, second, regulating knob 155 should be rotated on subscale 157 indicated by the vernier 153, third, indicating cylinder 149 should be raised half the thickness T of the web W and the standard indicating position of main indicator 152 to main scale 140 should be corrected. For example, in case the thickness T of the web W is 10 mm as shown in FIG. 10, when the regulating knob 155 is turned until subindicator 153 indicated 5 mm of half the measure of 10 mm on subscale 157, indicating cylinder 149 is raised and main indicator of the upper end shows the total measure of 55 mm which is the measure of 5 mm of half the thickness T of the web W in addition to the distance of 50 mm from supporting face of the upper end of periphery of the supporting rollers 27, 28, 30, 31 to the upper end of the detection member 143 is added on main scale 140.

After that, cylinder device 141 is worked, detection member 143, supporting plate 142, rolling mandrel 146 and indicating cylinder are moved 7.5 mm toward the upper direction at a time and when the upper end of detection member 143 contacts the bottom of the web W of the wide flange beam B supported on supporting rollers 27, 28, 30, 31, the movement toward the upper direction is stopped. In this stop, main indicator 152 of the upper end of the indicating cylinder 149 is on the center position C of web W and indicates 62.5 mm, the lower end of the flange F of the wide flange beam B on main scale 140, that is, the distance from supporting face S to the center position C of the web W. Still, on this measurement, in case wide flange beam B is too large for the upper end of the raised detection member 143 to contact the bottom of the web W, extention rod 144 will be connected with the upper end of detection member 143 to add to the length as indicated in FIG. 9. And, in this case, the distance from supporting face S to the center position C of the web W is the total is which measure indicated on main scale 140 with main indicator 152 and the length of extention rod 144.

After measuring the distance from the end of the flange F of the wide flange beam B in this way, according to the measure, the drilling positions for both flanges F are fixed as X mm toward the lower direction basing the center position C of the web W, and if the setting positions of drills 125a, 125b, 126a, 126b in the second and third drilling device are fixed, a plurality of bores will be drilled accurately at predetermined drilling positions of both flanges F.

Also the measuring device supports a main indicator 152 which indicates a main scale 140 on detection member 143 to be movable toward the upper and lower direction directly and can be assembled to regulate by half the thickness T according to the thickness T of the web W of the wide flange beam B in accordance with a scale attached to the periphery of detection member 143 or measure on main scale 140 indicated with main indicator 152 before measuring a standard indicating position of the main indicator 152.

From the foregoing, it is apparent that according to the present invention a multiple spindle drilling machine for wide flange beams in which a plurality of bores for inserting the rivets or the bolts can be drilled at predetermined drilling positions on the web W, at both ends of a wide flange beam and on a pair of flanges at the same time and accurately, and also the drilling work can be done easily and efficiently.

While a particular embodiment of this invention has been illustrated and described, modifications thereof will occur to those skilled in the art.

For instance, it is possible to drill a plurality of bores not only at the top end of the length of the wide flange beam but at the center thereof, or it is possible to use a different motor, oil pressure mechanism, air pressure mechanism or the like, as the driving source of the stopping device, clamping device, subsidiary supporting device or the like.

What is claimed is:

1. A multiple spindle drilling machine comprising a machine table having a supporting device on the upper side thereof for supporting a wide flange beam, feeding means positioned in front of said machine table for feeding a wide flange beam on said supporting device; first drilling means positioned so as to be moveable toward the web of a wide flange beam on said supporting device from the upper position of said machine table and having multi-drills for drilling a plurality of bores through the web; second and third drilling means positioned so as to be simultaneously moveable with said first drilling means toward a pair of flanges of a wide flange beam from both side positions of said machine table and having multi-drills for drilling a plurality of bores through the flange; and stopping means for stopping a wide flange beam fed on said supporting device by said feeding means at the predetermined drilling position, said stopping means including a stop member adapted to contact with the end portin of the wide flange beam for stopping the wide flange beam without moving over the predetermined drilling position and a switch member adapted to engage with the end portion of the wide flange beam for changing said feeding means under the static condition.

2. A multiple spindle drilling machine as claimed in claim 1, comprising means for clamping the wide flange beam fed on said supporting device by said feeding means at the predetermined drilling position before said first, second and third drilling means are to be operated.

3. A multiple spindle drilling machine as claimed in claim 2, wherein said clamping means include a regulating member mounted on one upper side portion of said machine table to contact with the outside of one flange of a wide flange beam on said supporting device and a press member mounted on other upper side portion of said machine table to contact with the outside of other flange, whereby the wide flange beam is clamped between said regulating member and said press member.

4. A multiple spindle drilling machine as claimed in claim 2, wherein said clamping means is a press member positioned in an upper position to contact with the upper side of the both flanges of the wide flange beam on said supporting device, whereby the wide flange beam is clamped between said press member and said supporting device.

5. A multiple spindle drilling machine as claimed in claim 1 wherein said feeding means including at least a drive roller with a bearing portion and a lifting device for lifting up at least one of the bearing portions of said drive roller over the supporting surface of said supporting device when the wide flange beam is carried by said drive roller.

6. A multiple spindle drilling machine as claimed in claim 1 wherein said supporting device is a plurality of supporting rollers with hardened peripheral surfaces which the lower end of the both flanges of the wide flange beam will contact.

7. A multiple spindle drilling machine as claimed in claim 3 with measuring means positioned on the machine table for measuring the length from a center portion of a web to one side end porition of flanges, whereby the multi-drills of said second and third drilling means are adjustable to desired drilling positions against the flanges in accordance with the measured length.

8. A multiple spindle drilling machine as claimed in claim 1 said measuring means including a detection member positioned so as to be between the flanges of a wide flange beam to be moved toward the web from a standard static position and to be stopped when the top portion touches the web, an indication member positioned to be moved with said detection member from a standard indicating position for indicating the length from the one side end portion of the flanges to the side portion of the web upon a scale member in accordance with the distance moved and means for amending the indicating position of said indication member from the standard indicating position by a half length of thickness of the web before said detection member is moved.

9. A multiple spindle drilling machine comprising a machine table having a plurality of supporting rollers on the upper side thereof for supporting a wide flange beam; first and second feeding means positioned in the front and rear of said machine table to advance or withdraw the wide flange beam with respect to said supporting rollers for feeding the front or rear end portion of a wide flange beam on said supporting rollers; first drilling means positioned so as to be moveable toward the web of a wide flange beam on said supporting rollers from the upper position of said machine table and having multi-drills for drilling a plurality of bores through the web, second and third drilling means positioned so as to be simultaneously moveable with said first drilling means toward a pair of flanges of the wide flange beam from both side positions of said machine table and having multi-drills for drilling a plurality of bores through the flanges; and first stopping means adapted to contact the front end portion of the wide flange beam fed on said supporting rollers by said first feeding means and second stopping means adapted to contact the rear end portion of the wide flange beam fed on said supporting rollers by said second feeding means, whereby the front and rear end portions of the wide flange beam are stopped at predetermined drilling position.

10. A multiple spindle drilling machine as claimed in claim 9, further comprising first clamping means for clamping the front end portion of the wide flange beam stopped on said supporting rollers by said first stopping means before said first, second and third drilling means are operated and second clamping means for clamping the rear end portion of the wide flange beam stopped on said supporting rollers by said second stopping means before said drilling means are operated.

* * * * *